(12) United States Patent
Adam

(10) Patent No.: US 6,302,936 B1
(45) Date of Patent: *Oct. 16, 2001

(54) RECYCLED SOIL

(76) Inventor: Paul Thomas Adam, 179 West Hamilton Ave., State College, PA (US) 16801

(*) Notice: Subject to any disclaimer, the term of this patent is extended or adjusted under 35 U.S.C. 154(b) by 0 days.

This patent is subject to a terminal disclaimer.

(21) Appl. No.: 09/372,841

(22) Filed: Aug. 12, 1999

(51) Int. Cl.$^7$ .................. C05F 3/00; C05F 11/02

(52) U.S. Cl. ............. 71/13; 71/15; 71/24; 71/25; 71/903; 71/904; 47/4; 405/258

(58) Field of Search .................. 71/13, 15, 24, 71/25, 903, 904; 47/4; 405/258

(56) References Cited

U.S. PATENT DOCUMENTS 5,472,475 * 12/1995 Adam ........................ 71/13

* cited by examiner

Primary Examiner—Chhaya D. Sayala
(74) Attorney, Agent, or Firm—Eugene C. Rzucidlo; Greenberg Traurig, LLP

(57) ABSTRACT

A process for making an artificial soil includes first combining the volume percentages of the following substances:
  5–95% materials suitable for use as a blending base;
  5–95% cellulose;
  0.5–50% bio-solids;
  0.1–10% calcium;
  0.1–5% charcoal; and
  0.5–4% ammonium nitrate or sulfate.

The above substances are ground until a homogeneous mixture is obtained, after which the artificial soil can be either blended in place or manufactured at one location and transported to another location for use.

15 Claims, No Drawings

RECYCLED SOIL

BACKGROUND OF THE INVENTION

1. Field of the Invention

The present invention is a method of preparing artificial or recycled soil. As is generally understood, topsoil erosion due to deforestation, over-farming, and poor soil management by farmers along with natural desertification are the root causes of many of our environmental problems. Topsoil comprises many distinct layers, the most important of which for the purposes of this invention are referred to in the art as the "A-layer", the "B-layer", and the "C-layer". The A-layer is the uppermost layer and includes humus and microbial biomass mixed with small-grained minerals. The B-layer is below the A-layer and is characterized by an accumulation of clay particles. The C-layer is below the B-layer and includes unconsolidated parent material from which the A- and B-layers are derived. The C-layer includes little or no humus accumulation or soil structure development.

It is therefore my intent to treat the cause rather than the effect by creating an artificial soil to replace the lost natural soil or recycle natural soil in place in fields, groves, and any site that may need soil or where the already existing soil may need to be recycled. The product can be prepared in place or shipped to other locations. It is useful and practical as potting soil, in green houses, nurseries, gardens, for retail outlets, landscapers, farmers, silviculture, large scale reclamation such as landfills, strip mines, deforested areas, golf courses, sports fields and even in artificial environments in space and on earth.

2. Description of Prior Art

In the past there have been proposals for artificial soil, some of which currently hold patents in the United States. One of these patents, U.S. Pat. No. 4,501,604 ("'604 patent"), is, in my opinion, impractical for widespread use due to expensive, lengthy, and complicated manufacturing processes. Another patent, U.S. Pat. No. 5,472,475, is mine. My invention solves these problems by using inexpensive existing technology, recycled materials, and simple manufacturing techniques. In the case of the '604 patent, long periods of time and several locations are required, whereas with my process the ingredients can be mixed by hand or by using any of the equipment disclosed herein at one location in just a few minutes, producing, in effect instant soil.

SUMMARY OF THE INVENTION

The object of the invention is to produce an artificial soil from well known and easily obtainable substances. The loss of topsoil is a critical issue for the future of our national and global economies. By replacing lost topsoil we can continue to grow crops and forests indefinitely. We can replace and restore soil in every country and thereby feed the world's expanding population. The ability to recycle soils will allow developing countries to help feed areas where agriculture is difficult. Civilization and soil fertility go hand in hand, cities and populations are dependent on soil fertility and when it declines civilization declines with it.

To make an artificial topsoil by hand or with blending equipment, first create a blending base using, either alone or in combination, materials such as river silt, dredged material, sand, basalt, rhyolyte, clay, mine tailings, residuals, or any natural or manmade, treated or processed, waste products applicable for use in making soils, pre-existing soil, soil taken from another location, any ordinarily depleted, eroded, or contaminated soil, or B-layer soil. This blending base can be placed on top of or combined with any C-layer. Next, add cellulose in any form, composted or uncomposted, with composted human waste for mine and landfill type reclamation and composted animal manure for forests or natural areas with wildlife and for farms of all kinds. For a cleaner formula for gardens or potting soil, use vegetable or fruit residuals (the fruit or vegetable itself or its rinds or skins or seeds), bagged or loose. Then add calcium or lime in any form, such as agricultural lime or quick lime, ammonium nitrate or sulfate, preferably but not necessarily mixed with water, and then charcoal or equivalent amounts of phosphorus, sodium, and sulfur as are present in charcoal. The concentration of ammonium nitrate or sulfate can be adjusted to achieve a desired ph, and is optional if animal or human bio-solids are used. This combination of materials replicates the mineral base, cellulose and animal and vegetable waste structure of natural soils.

Any soil type on earth can be duplicated by adjusting the blending base, and re-arranging the nutrient and mineral content so as to compensate for differing levels of each in any soil. This formula can be blended into any natural, manmade, processed, treated, contaminated or uncontaminated pre-existing soil or manufactured blending base. Alternatively, the formula can be blended by itself using the following equipment: any kind of plow, a pugmill or any commercial soil blender, a soil stabilizer, a roto-tiller of any size or type, a manure spreader, vehicles designed to spread soil additives, trommel type screens, cement mixer of any size or type, barrels, tubs, buckets, shovels, rakes, a hoe, or by hand. After the soil is blended, the local microbiotic life can be transplanted by gathering small amounts of local natural soil and inoculated by spreading over the blended area.

DETAILED DESCRIPTION OF THE PREFERRED EMBODIMENTS

Because of the shallow root structures of most food crops, it is only necessary to replace the A-layer in order to revive a depleted field. This layer consists of approximately one foot of dead plant cellulose, animal waste, charcoal, and a mineral base from the following materials: silt, clay, sand, basalt, rhyolyte, limestone or granite. These materials when combined make up the structure of natural soil profiles.

To make an artificial soil, combine 5 to 95% percent by volume, silt, dredged material, sand, clay, basalt, rhyolyte or blend the aforementioned substances into already existing soils in place. Next, add 5 to 95% cellulose, composted or uncomposted, from recycled wood products such as short fiber waste, sawdust, paper, green waste, yard waste, crop leaves, stems, roots, fruit, vegetable, or any other form of cellulose with 0.50 to 50% fruit or vegetables residuals or bio-solids in the form of lime-treated, thermally-treated, or composted animal or human waste. Then add 0.1 to 10% agricultural lime or calcium in any form, and 0.5 to 4% ammonium nitrate or sulfate, not necessarily but preferably mixed with water, and 0.10 to 5% charcoal. As an alternative to charcoal, nitrogen-phosphorus-potassium ("NPK") fertilizer, field burn-off, or the equivalent amounts of phosphorus, sodium and sulfur as are present in charcoal can be added to the soil. Calcium and organic percentages should be increased to the maximum when using sand as a base. The calcium should be decreased to the minimum when using silt, dredged material, clay, basalt, or rhyolyte as a base. Also, any naturally present, manmade, treated, processed, contaminated or uncontaminated waste product can be used as a blending base. The mixture can be manufactured by hand or with any of the equipment mentioned in this disclosure. Except for ammonium sulfate or nitrate, the dry ingredients are mixed first, after which the ammonium nitrate or sulfate is mixed with water and added until the mixture acquires a friable texture. Bio-solids can be optional where contaminants or cost is problematic.

The exact percentages by weight and volume I used to blend a prototype mixture are as follows (allow some variation due to different methods of mixing).

| Ingredients | Volume | Weight |
|---|---|---|
| Silt | 30.17 | 71.36 |
| Cellulose | 58.63 | 14.70 |
| Residuals | 7.24 | 2.59 |
| Lime | 3.88 | 11.23 |
| A. nitrate | 0.074 | 0.1 |
| Charcoal | 0.01 | 0.1 |

In addition, the following substances can be blended into an already existing soil, dredged material, base material, B-layer, or laid on top of or mixed into any C-layer, wherein the materials can be natural, manmade, contaminated or uncontaminated, and treated or untreated or processed in any way. The concentrations presented herein are based on a 6 inch layer, which corresponds to 807 cubic yards per acre. This can be increased to a 12 inch layer, or 1600 cubic yards per acre, when depth is available. For landfills, a 24 inch layer, or 3200 cubic yards per acre, is preferable.

| Ingredients | Concentration |
|---|---|
| Cellulose | 40.4 to 767 cubic yards per acre |
| Bio-solids | 4 to 440 cubic yards per acre |
| Calcium | 0.81 to 80.7 cubic yards per acre |
| Charcoal | 0.81 to 40.4 cubic yards per acre |
| A. nitrate or A. sulfate | 4.04 to 32.3 cubic yards per acre |

Dredged materials, silt, sand, clay, basalt and/or rhyolyte can also be added to an already existing, mostly cellulose soil, such as peat or rainforest soil, to allow the soil to grow any desired crop, either indigenous or foreign. A preferred concentration for these added materials is in the range of 8.1 to 404 cubic yards per acre. Alternatively, any mineral or combination of minerals suitable for growing a particular crop can be added to the pre-existing soil.

The system of the invention is not limited to the embodiments disclosed herein. It will be immediately apparent to those skilled in the art that variations and modifications to the disclosed embodiment are possible without departing from the spirit and scope of the present invention. The invention is defined by the appended claims.

What is claimed is:

1. An artificial soil composition which can duplicate any natural soil, said artificial soil comprising a homogeneous mixture of the following substances, in which the percentage range by volume of said substances is:
   5–95% substances suitable for use as a blending base, wherein these substances can be unprocessed, processed in any way, uncontaminated, or contaminated;
   5–95% cellulose, wherein the cellulose can be uncontaminated, contaminated, uncomposted, composted, or processed in any way;
   0.5–50% bio-solids, either unprocessed or processed in any way;
   0.1–10% calcium in any form;
   0.1–10% burned crop waste or burned vegetation; and
   0.5–4% ammonium sulfate.

2. The soil composition of claim 1, wherein the material suitable for use as a blending base may be selected from the group consisting of dredged material, clay, any naturally present or manmade waste product, pre-existing soil, B-layer soil, C-layer soil, and mixtures thereof.

3. The soil composition of claim 2, wherein the calcium can be selected from the group consisting of calcium silicate, quick lime, and lime, or can be replaced by aluminosilicate.

4. The soil composition of claim 3, wherein the bio-solids can be selected from the group consisting of stems, leaves, roots, trunks, bark, seeds, and any plant part.

5. The soil composition of claim 4, wherein the ammonium sulfate may be replaced from the group consisting of animal bio-solids, and human bio-solids.

6. The soil composition of claim 5, wherein the cellulose is selected from the group consisting of saw dust, short fiber waste, green waste, and crop waste.

7. The soil composition of claim 1, further comprising:
   5–30% silt, sand, basalt, or rhyolyte;
   5–30% recycled paper or yard waste;
   0.5–10% animal waste, human waste, or fruit and vegetable residuals;
   0.1–5% calcium in any form;
   0.1–5% charcoal; and
   1–4% ammonium nitrate.

8. A process for making an artificial soil comprising the steps of:
   (a) combining the volume percentages of the following substances:
      5–95% substances suitable for use as a blending base, wherein these substances can be unprocessed, processed in any way, uncontaminated, or contaminated;
      5–95% cellulose, wherein the cellulose can be uncontaminated, contaminated, uncomposted, composted, or processed in any way;
      0.5–50% bio-solids, wherein the bio-solids can be unprocessed or processed in any way;
      0.1–10% lime in any form;
      0.1–5% burned crop waste or burned vegetation;
      0.5–4% ammonium nitrate or sulfate;
   (b) grinding the above substances until a homogeneous mixture is obtained, wherein said artificial soil can be either blended in place or manufactured at one location and transported to another location for use.

9. The process of claim 8, wherein the substances suitable for use as a blending base include dredged material, clay, any naturally present or manmade waste product, pre-existing soil, B-layer soil, C-layer soil, and mixtures thereof.

10. The process of claim 8, wherein the cellulose includes saw dust, short fiber waste, green waste, and crop waste.

11. The process of claim 8, wherein the bio-solids are selected from the group consisting of stems, leaves, roots, trunks, bark, seeds, and any other plant part.

12. A soil composition comprising any combination of soils selected from the group consisting of existing soil, dredged material, base material, B-layer soil, and C-layer soil, and one or more of the following substances, wherein the concentration range by volume of said following substances for a 6-inch thick layer of said soil composition is:
   cellulose, at 40.4 to 767 cubic yards per acre;
   bio-solids, at 4 to 440 cubic yards per acre;

calcium, at 0.81 to 80.7 cubic yards per acre;

charcoal, at 0.81 to 40.4 cubic yards per acre; and ammonium nitrate or ammonium sulfate, at 4.04 to 32.3 cubic yards per acre.

13. A process for customizing soil to grow any desired crop, indigenous or foreign, comprising adding any combination of substances selected from the group consisting of dredged material, silt, sand, clay, basalt, and rhyolyte, to existing cellulose-based soils, wherein said substances can be treated or untreated, contaminated or uncontaminated, or processed in any way, and wherein the concentration range by volume of said substances is from 8.1 to 404 cubic yards per acre.

14. The process of claim 13, further comprising adding to said cellulose-based soils a mineral or combination of minerals suitable for growing a particular desired crop.

15. The soil composition of claim 1, further comprising:

60–95% silt, sand, basalt, or rhyolyte;

60–95% recycled paper or yard waste;

20–50% animal waste, human waste, or fruit and vegetable residuals;

0.1–5% calcium in any form;

0.1–5% charcoal; and

1–4% ammonium nitrate.

* * * * *